(12) United States Patent
Emery et al.

(10) Patent No.: US 11,363,763 B2
(45) Date of Patent: Jun. 21, 2022

(54) PORTABLE DRAINAGE SYSTEM FOR GROWING PLANTS

(71) Applicant: R.T.D. Enterprises, Madison, ME (US)

(72) Inventors: Troy W Emery, Madison, ME (US); Robbie W Emery, Madison, ME (US); Karl V Krotzer, Cleveland, OK (US); Jacob L Baumler, Cleveland, OK (US)

(73) Assignee: R.T.D. Enterprises, Madison, ME (US)

( * ) Notice: Subject to any disclaimer, the term of this patent is extended or adjusted under 35 U.S.C. 154(b) by 0 days.

(21) Appl. No.: 17/128,411

(22) Filed: Dec. 21, 2020

(65) Prior Publication Data

US 2021/0368693 A1   Dec. 2, 2021

Related U.S. Application Data

(63) Continuation-in-part of application No. 15/929,877, filed on May 27, 2020, now Pat. No. 10,974,173.

(51) Int. Cl.
| | |
|---|---|
| *A01G 9/24* | (2006.01) |
| *A01G 25/16* | (2006.01) |
| *A01G 27/00* | (2006.01) |
| *A01G 9/28* | (2018.01) |

(52) U.S. Cl.
CPC ............... *A01G 9/247* (2013.01); *A01G 9/28* (2018.02); *A01G 25/167* (2013.01); *A01G 27/003* (2013.01)

(58) Field of Classification Search
CPC . A01G 9/00; A01G 9/247; A01G 9/28; A01G 25/167; A01G 27/003

USPC ................. 47/18, 65.5, 66.5, 79, 86; 405/37
See application file for complete search history.

(56) References Cited

U.S. PATENT DOCUMENTS

| | | | | |
|---|---|---|---|---|
| 5,749,170 | A * | 5/1998 | Furuta | A01G 27/003 47/79 |
| 2006/0168882 | A1 * | 8/2006 | Hashimoto | A01G 27/003 47/64 |
| 2008/0092442 | A1 * | 4/2008 | Singer | A01G 9/20 47/66.1 |
| 2014/0060164 | A1 * | 3/2014 | Tomida | A01G 25/167 73/73 |
| 2015/0282441 | A1 * | 10/2015 | Marshall | A01G 27/003 47/79 |
| 2017/0347538 | A1 * | 12/2017 | Nakajima | A01G 9/247 |

* cited by examiner

*Primary Examiner* — Christopher Upton
(74) *Attorney, Agent, or Firm* — Ted D. Lee; Gunn, Lee & Cave, P.C.

(57) ABSTRACT

A plant growing system has a number of modular units arranged together on a flat surface in side of a growing room. The modular units have rigid boxes therein with vertical holes therethrough inside of which is located a growing soil. Water and nutrients are pumped from a reservoir to a distributor located in a growing soil of the rigid boxes as called for by moisture sensors, which activates a controller to turn ON a delivery pump. When moisture and nutrients need to be removed from an impermeable flexible liner located below the modular units, the controller turns ON a return pump, which pumps the excess water and nutrients back to the reservoir.

6 Claims, 7 Drawing Sheets

PORTABLE DRAINAGE SYSTEM FOR GROWING PLANTS

RELATED APPLICATION

This application is a continuation-in-part of application Ser. No. 15/929,877, filed on May 27, 2020.

FIELD OF THE INVENTION

This invention relates to a drainage system and, more particularly, to a portable drainage system for growing plants.

BACKGROUND

After production of bulk granular material, whether by mining, crushing or some other process, many times water or other fluids needs to be removed from the bulk granular material. For example, frac sand is used in the hydraulic process known as "fracing" to produce petroleum fields. Most frac sand has a large amount of moisture which needs to be removed prior to shipping. The frac sand may be washed to remove fine particles. After washing, the frac sand is put in piles to allow the water to drain therefrom.

Other industries also require the draining of bulk granular material. For example, during coal mining, water is sprayed to control coal dust. Upon removing coal from the mine, the water needs to be removed prior to shipment. The present portable drain system can be used to remove the water from the mined coal.

There are many other types of bulk granular materials that need to be drained for removal of liquids prior to shipment. The drainage of bulk granular material is common in the construction, mining or agricultural industries. For example, after diatomaceous earth is removed from the ground, it needs to have water removed. Fertilizers, whether natural or synthetic, need to be drained and dried prior to packaging and shipment. While a heater may remove some of the final moisture content, the majority of the moisture can be removed by a drainage system. For most bulk granular materials, a majority of the moisture can be removed by the portable drainage system as shown in the present invention.

In an alternative embodiment, the modular units used in a drainage of bulk granular material can be used in a grow room for growing plants. A grow room is a room of any size where plants can be grown in controlled conditions. Plants in a grow room can be grown in soil with the moisture delivered to the plant being controlled. By use of a grow room one can get a much higher yield as well as a faster maturation. Even in a grow room, the amount of moisture being applied to the plants needs to be controlled, in addition to lighting and nutrition. A grow room with a controlled irrigation system is a combination of hydroponics and a substrate that can provide the nutrients needed by the plants.

SUMMARY OF THE INVENTION

The location of a portable drainage system for bulk granular materials that incorporates the present invention is on a graded slope of approximately 2 to 3 degrees. On the downside of the graded slope is a perforated header pipe.

Uphill from and under, the perforated header pipe is an impermeable flexible liner that has a cushion layer on both sides. The cushion layers are made of non-woven geotextile material. Above the impermeable flexible liner are located a plurality of modular units that are rectangular in shape and abut each other on the sides. The outer periphery of the modular units are attached together by connecting plates.

The modular units are made up of top open rigid boxes that have connecting cross slots in the bottom thereof. The rigid boxes also have small vertical holes through the bottom. Inside of the rigid boxes is a site specific drainage fabric, which lines the inside of the rigid boxes. The site specific drainage fabric should be woven tight enough so that the granular bulk material being drained would not pass there through, but loose enough so the water or other liquids would flow there through.

Inside of the rigid boxes resting on the site specific drainage fabric is expanded geosynthetic material, which may be filled with bulk granular material from the site. An example is the Presto Geoweb Cellular Containment System, or the Neoloy Geocell System.

Over the top of multiple modular units is a high flexural strength mat, which may be connected with other high flexural strength mats to cover the entire drainage system. The high flexural strength mats are strong enough so that when resting on multiple modular units, it can support heavy equipment, such as front end loaders, that may move bulk granular material onto, and off of, the portable drainage system.

An air inlet pipe on the uphill side of the portable drainage system connects to the connecting cross slots in the bottom of the rigid boxes. A valve controls the air flow through the air inlet pipe through the connecting cross slots, and into the perforated header pipe on the low side of the graded slope at the portable drainage system. The airflow causes aspiration through the drainage system to remove water, sometimes called "decant" fluids. The decant fluids flow through the perforated header pipe to a location removed from the drainage system.

On the outside of the modular units, a ramp is provided on one or more sides so that heavy equipment such as front end loaders, can drive on top of the portable modular system. The ramps may be made of small rocks or other suitable material.

Once the portable drainage system is no longer needed at one location, it may be disassembled and moved to a new location. The one item that may have to be periodically replaced is the impermeable flexible liner; otherwise the other component parts are reusable, unless for some reason the component parts are damaged during the prior use.

In an alternative embodiment, the top open rigid boxes are collected together in a grow room, which top open rigid boxes have a drainage fabric therein. The drainage fabric is woven tight enough so that growing soil would not pass therethrough, but loose enough so that water and other liquids would flow therethrough. In an improbable flexible liner with a cushion on both sides is located below the top open rigid boxes. The water reservoir is connected to an irrigation system located in the top open rigid boxes. Water from the water reservoir is applied to the growing soil to keep it at a predetermined moisture content. Access water drains through small vertical holes in the bottom of the top open rigid boxes. The water is collected by the impermeable, flexible liner for recirculation back to the water reservoir. In this manner, plants can be grown in the growing soil with water being circulated from the water reservoir as desired for ideal growing conditions. Nutrients can be applied to the water as needed to give maximum growth of plants.

DETAILED DESCRIPTION OF THE INVENTION

Figure 10:
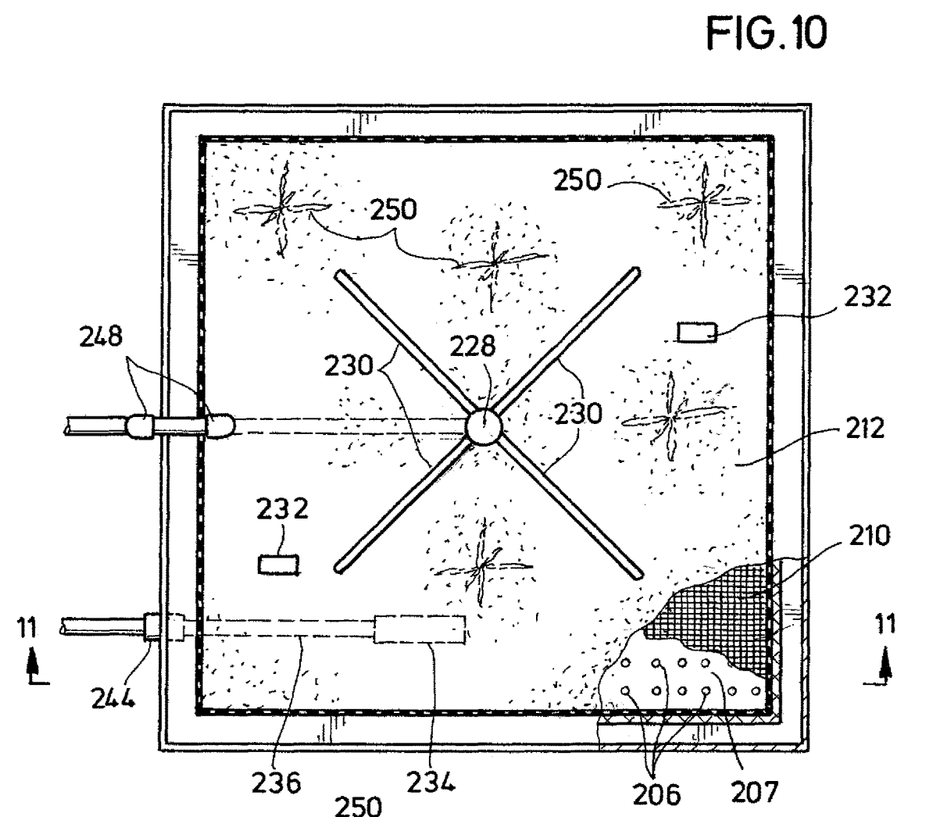
FIG. 10 is a top view of a modular unit being used to grow plants.

A portable drainage system is illustrated in the top view shown in FIG. 10. The portable drainage system has modular units 12 that are rectangular in shape and located side by side. Ramps 14 are provided so that loading equipment such as front loaders can be driven on top of the portable drainage system 10. As will be explained in more detail subsequently, an air inlet pipe 16 connects through a valve 18, below the modular units 12, to a perforated header pipe 20. FIG. 2 is a side view of FIG. 1.

Figure 1:
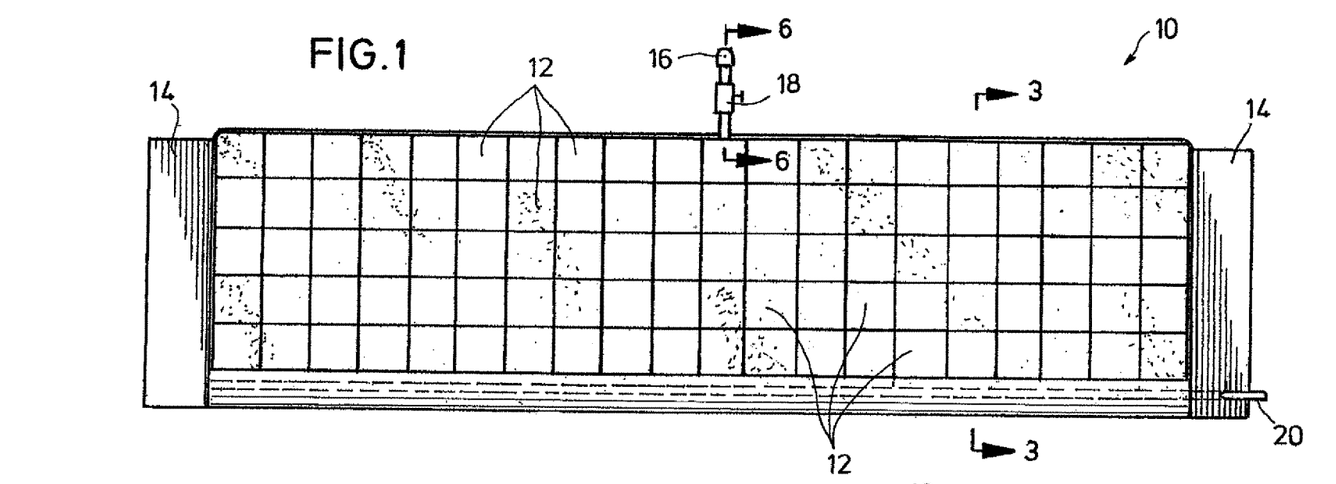
FIG. 1 is a top view of a portable drainage system.
Figures 2, 3:
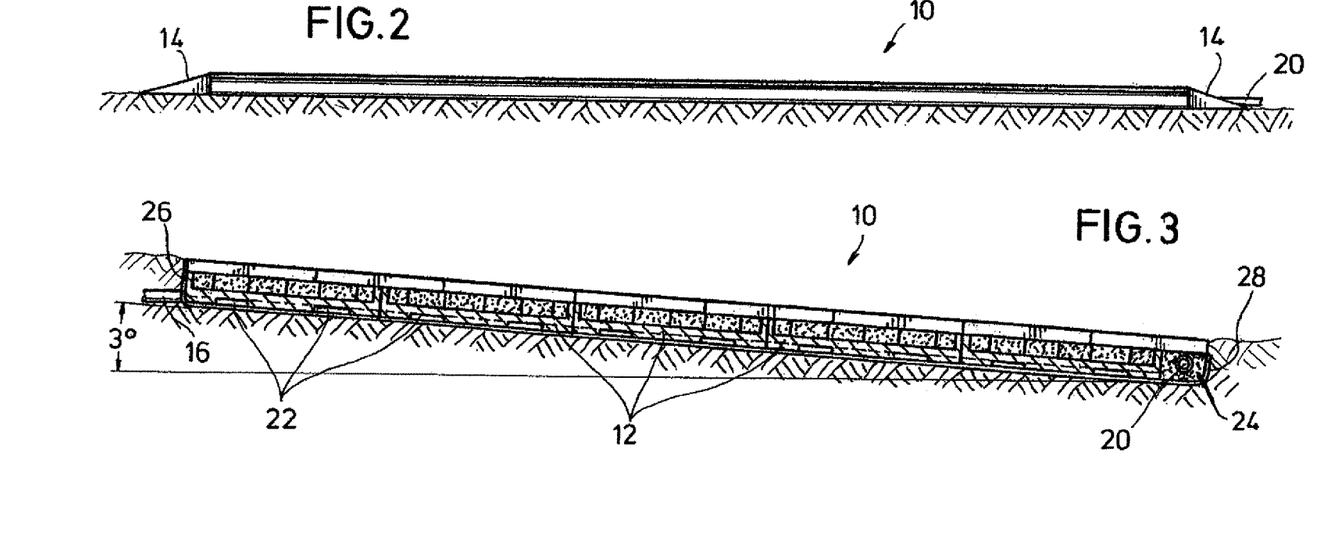
FIG. 2 is a front view of FIG. 1.
FIG. 3 is an enlarged sectional view of FIG. 1 along section lines 3-3.

Referring to FIG. 3, an enlarged cross sectional view of FIG. 1 along section lines 3-3 is shown. The modular units 12 are located side by side with the air inlet pipe 16 providing air through connecting cross slots 22 to the perforated header pipe 20, which perforated header pipe 20 is buried in a porous granular material 24.

As illustrated in FIG. 3, a portable drainage system 10 has an upslope end 26 and a downslope end 28. On the upslope end 26 is the air inlet pipe 16 and on the downslope end 28 is the perforated header pipe 20. The slope between the upslope end 26 and the downslope end 28 is approximately 2-3 degrees.

Figure 5:
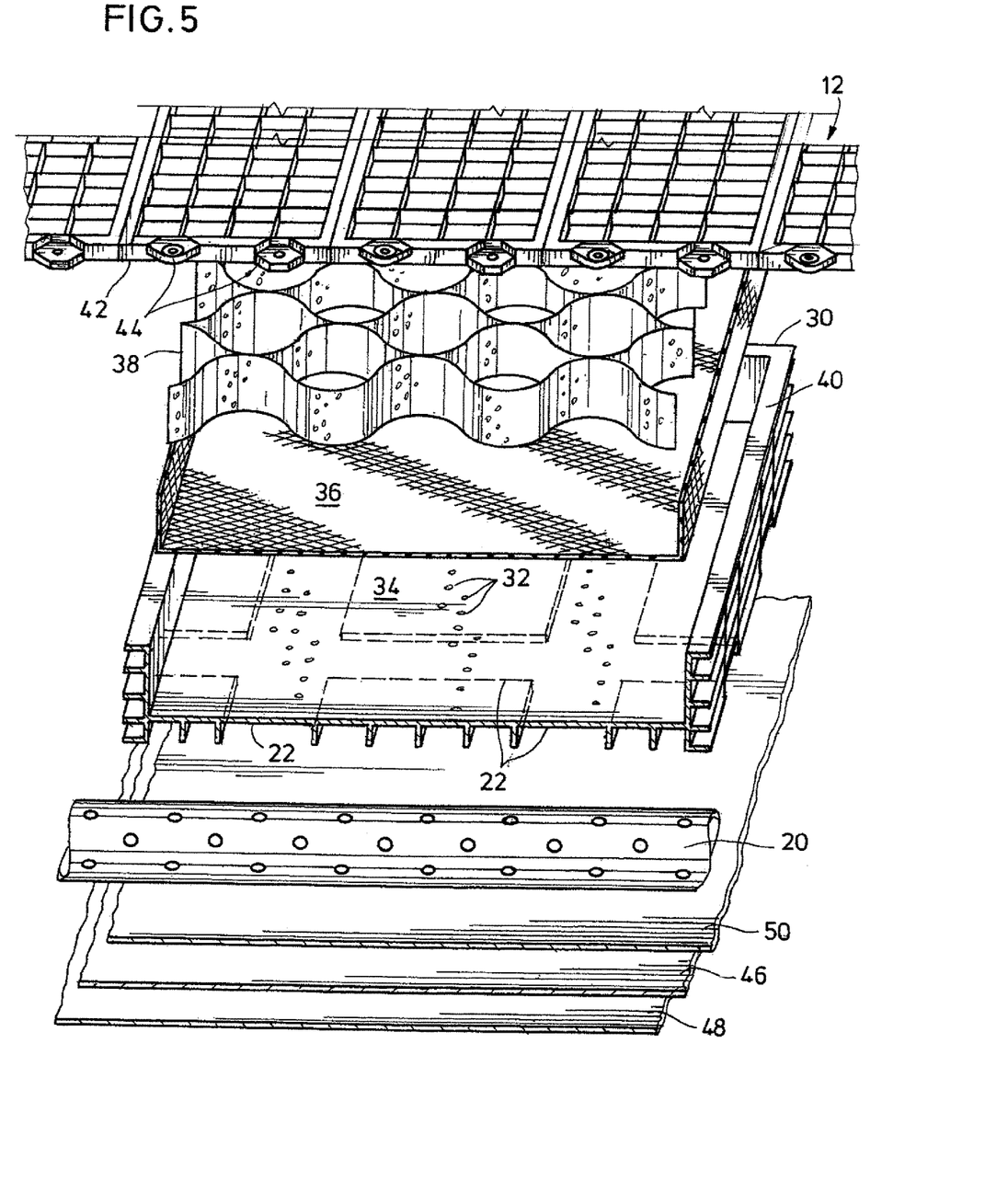
FIG. 5 is an exploded perspective view of one modular unit in FIG. 1.

Referring to FIG. 5, the construction of a modular unit 12 is shown in an exploded view. The modular unit 12 has a rigid box 30 which is almost 4 feet by 4 feet but not quite. Small vertical holes 32 extend through the bottom 34 on the rigid box 30. In the bottom 34 of the rigid box 30 are the connecting cross slots 22.

Within the rigid box 30 is a site specific drainage fabric 36. The site specific drainage fabric 36 should be a tight enough weave so the granular material being drained will not pass there through, but not so tight that water or other fluids will not drain there through. The site specific fabric 36 extends up the inside walls of the rigid box 30, the upper edges of which may be held in position against the inside of the rigid box 30 by any convenient means such as snaps.

Inside of the rigid box 30 and the site specific drainage fabric 36 is located a four inch cellular confinement, also referred to as expanded geosynthetic material 38. The expanded geosynthetic material 38 extends upward to the top 40 of the rigid box 30. Filled within the expanded geosynthetic material 38 also to the top 40 of the rigid box 30 is sand (not shown), or whatever porous granular material 56 is available at the site. See FIG. 6.

Extending across the top 40 of multiple rigid boxes 30 is a high flexural strength mat 42, such as those sold under the trademark Geoterra®. The high flexural strength mats 42 may be connected to adjacent high flexural strength mats 42 by connecting tabs 44. The connecting tabs 44 are attached together by any convenient means such as locking screws (not shown).

Figure 4:
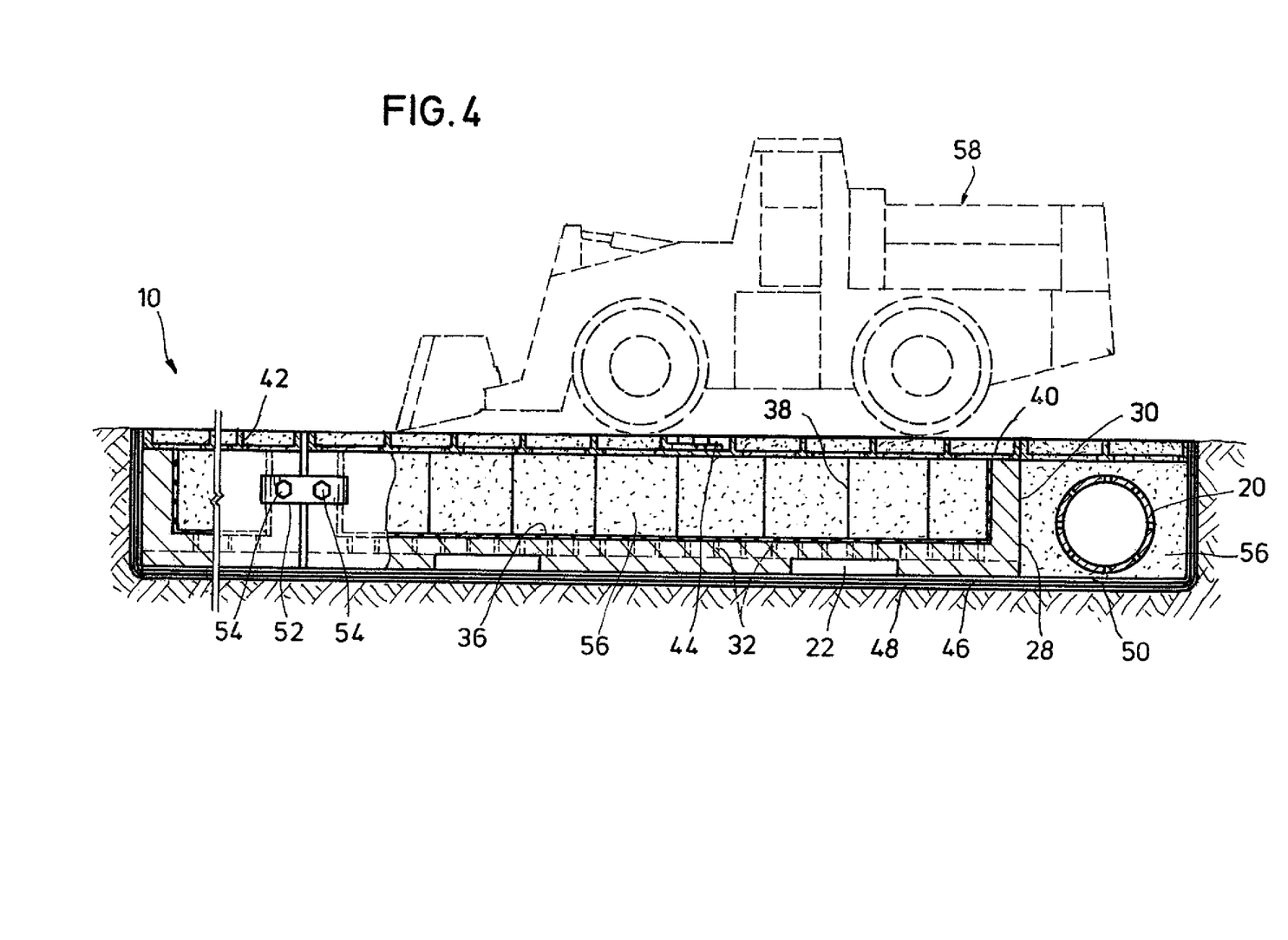
FIG. 4 is an enlarged partial view of FIG. 3.

Referring to FIG. 4 and FIG. 5 in combination, below the rigid boxes 30 for the entire portable drainage system 10 is located an impermeable flexible liner 46. The impermeable flexible liner 46 also extends upward to the top on the outside of all the rigid boxes 30 collected together. The impermeable flexible liner 46 is cushioned on either side thereof with cushioning layers 48 and 50, which cushioning layers are made of non-woven geotextile material. The cushioning layers 48 and 50 also extends up the outside of all the rigid boxes up to the top thereof, the same as the impermeable flexible liner 46.

The outer edges of the rigid boxes 30 are connected together by plates 52 and bolts 54 which screw into rigid boxes 30.

FIG. 4 shows a porous granular material 56 (such as sand) that is placed inside of expanded geosynthetic material 38 contained within rigid boxes 30. The porous granular material 56 is also located around the perforated header pipe 20. Once the portable drainage system 10 has been assembled with porous granular material 56 located within the expanded geosynthetic material 38, then high flexural strength mats 42 are placed across the tops 40 of the rigid boxes 30. Thereafter, heavy equipment such as a front end loader 58 may be driven on the top of the portable drainage system 10 without causing damage to the drainage system 10.

Figure 6:
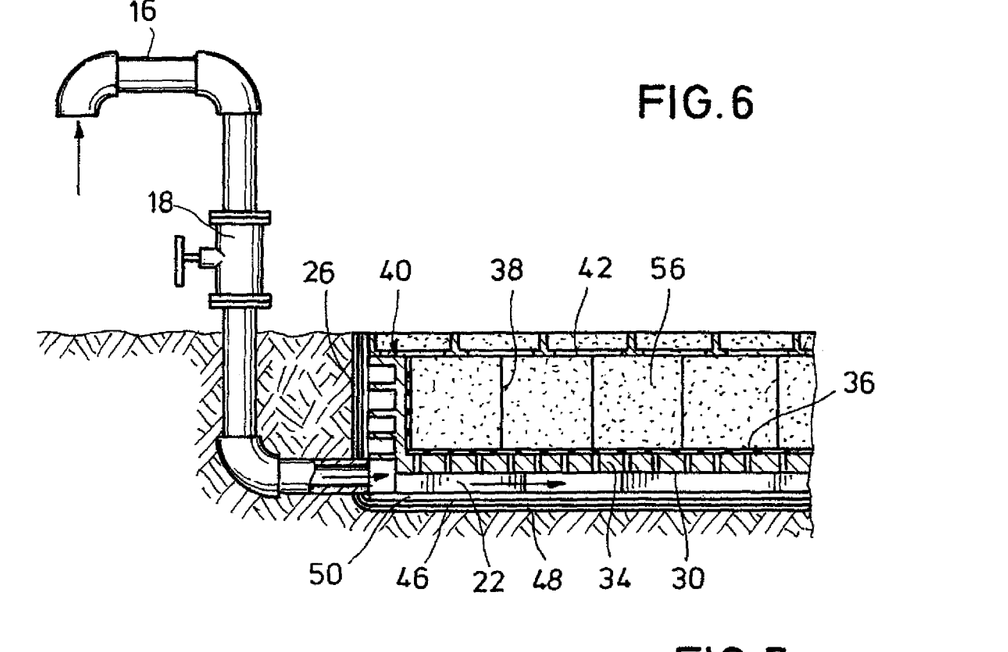
FIG. 6 is a partial sectional view of FIG. 1 along section lines 6-6.

Referring now to FIG. 6, if the valve 18 is opened, air inlet pipe 16 allows air to flow there through in the direction indicated by the arrows and into connecting cross slots 22 in the bottom 34 of the rigid boxes 30. Because the water flows downhill and the air inlet pipe 16 is on the upslope end 26, water will flow to the downslope end 28 where the perforated header pipe 20 is located within the porous granular material 56. See FIG. 3. The perforated header pipe 20 will take the drained water (or decant) away for suitable disposal in a drainage pond (not shown) or some other off site location.

Figure 7:
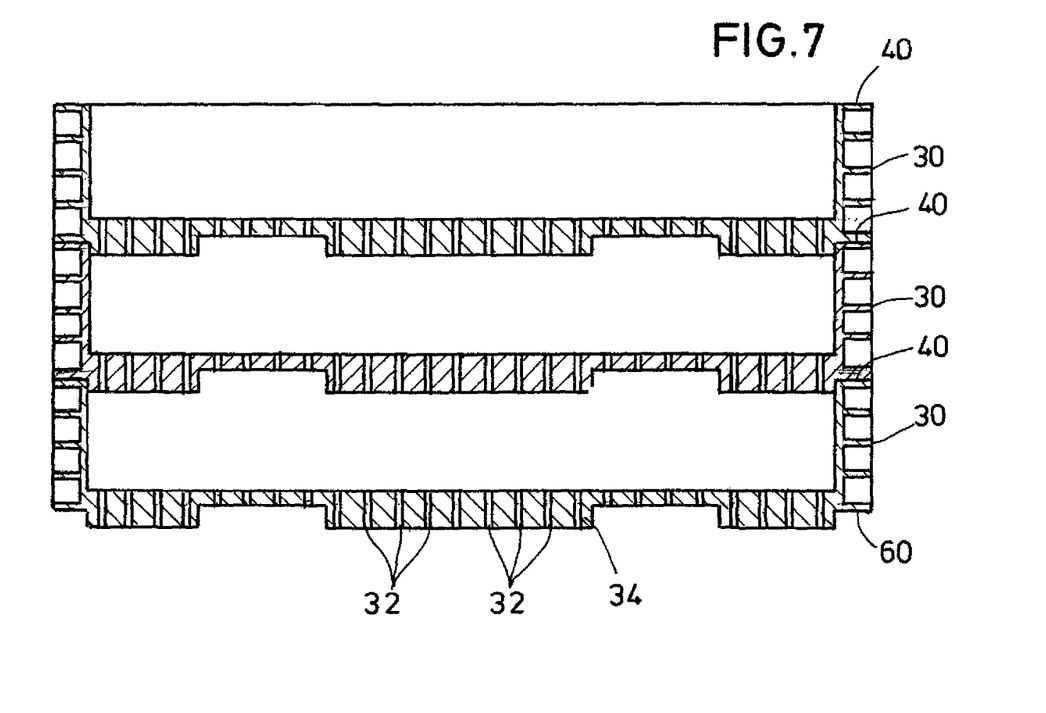
FIG. 7 is a sectional view of the rigid boxes being stacked for shipment.

During movement between different sites, rigid boxes 30 are shown FIG. 7 stacked together ready for shipment. The outer edges of the rigid boxes 30 have an indent 60 where the top 40 of a lower rigid box 30 will fit. Therefore, the rigid boxes 30 can be stacked multiple boxes high during transportation without scooting all over the transportation vehicle. Further in FIG. 7, the small vertical holes 32 through the bottoms 34 of the rigid boxes 30 are shown in more detail.

By using the portable drainage system 10 as just described, and due to the natural flowing of water downslope, a slight vacuum is created that will suck air into the air inlet pipe 16, through valve 18, and connecting cross slots 22 as the water flows downslope to the perforated header pipe 20 for removal from the portable drainage system 10. This natural aspiration without mechanical pumps creates an inexpensive portable drainage system for bulk granular materials.

Referring now to FIGS. 8-11, an alternative plant growing system 200 is shown for the portable drainage system previously shown and explained. The plant growing system 200 has modular units 202, which are shown in an exploded perspective, sectional view of FIG. 9. The modular units 202 have a rigid box 204 that has vertical holes 206 therethrough. In the bottom 207 of the rigid boxed 204 are cross slots 208.

Figure 9:
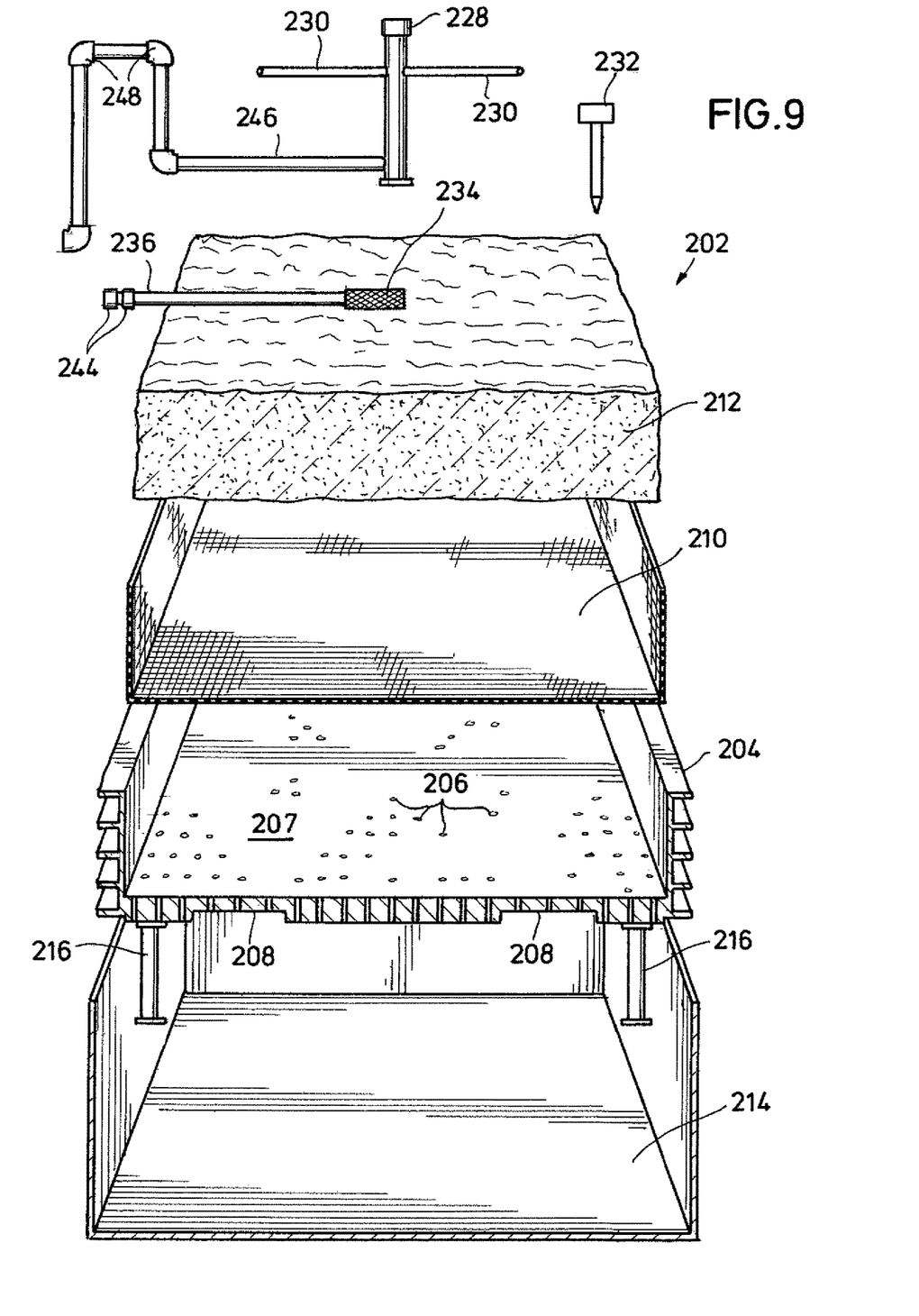
FIG. 9 is an exploded perspective view of a modular unit as modified to grow plants.

Inside of the rigid boxes 204 is a sight specific drainage fabric 210. Contained in the sight specific drainage fabric 210 is located growing soil 212. The sight specific drainage fabric 210 is woven so that it is dense enough to retain the growing soil 212, yet course enough that it will allow water or similar fluids to pass therethrough.

In a plant growing system 200, there may be one or more of the modular units 202. An impermeable flexible liner is located under and around all of the modular units 202 contained in the plant growing system 200. Normally, there will be many modular units 202 connected together, all of which are contained within the impermeable flexible liner 214.

In case the cross slots 208 are not deep enough, or more room is needed below the rigid box 204, the rigid box 204 may be mounted on post 216.

Figure 8:
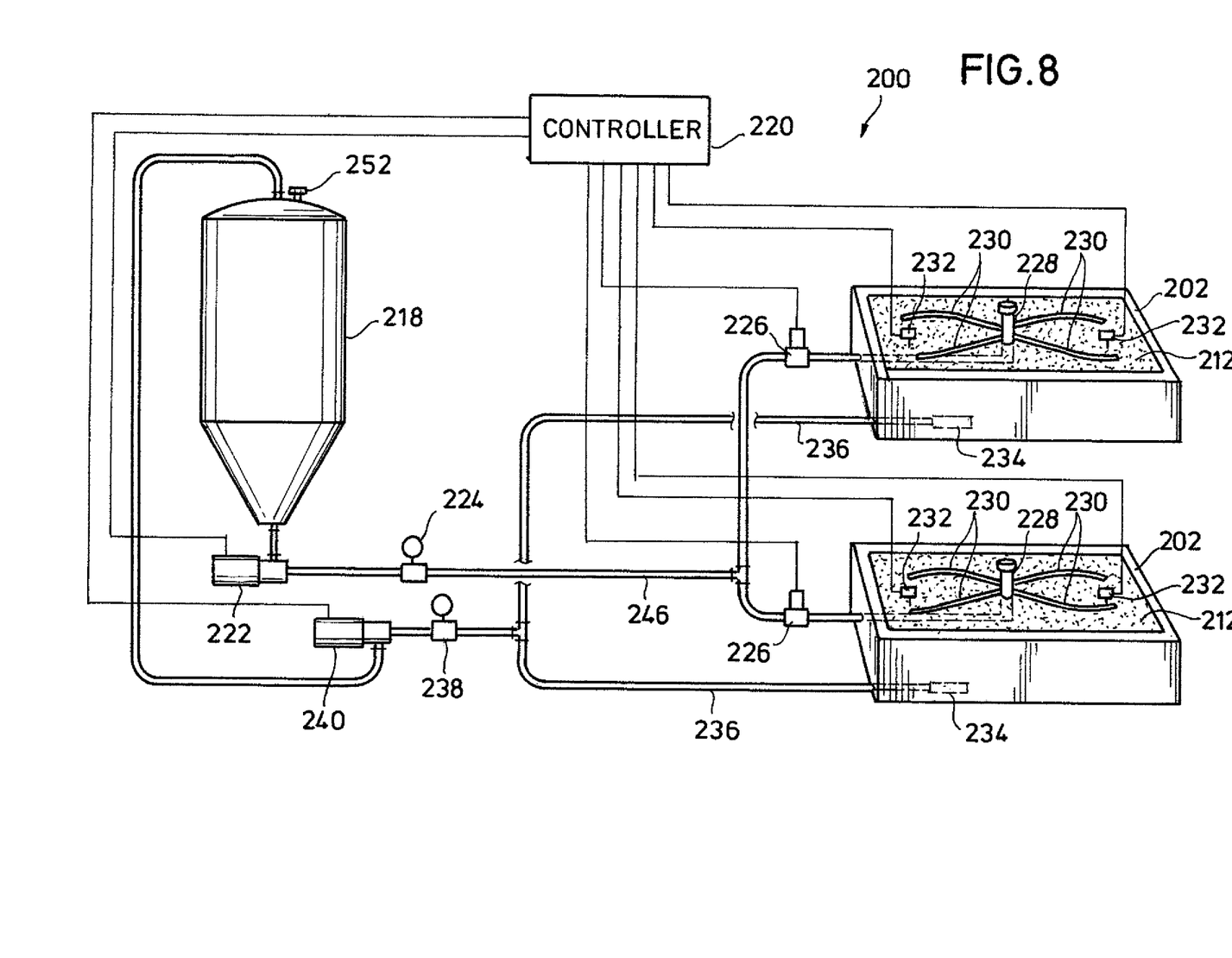
FIG. 8 is an alternative embodiment of the portable drainage system being used to grow plants.

Referring now to FIGS. 8 and 9 in combination, water reservoir 218 contains water and nutrients necessary to grow plants. A controller 220 controls action within the plant growing system 200. The controller 220 will turn on the pump 222 to pump water and nutrients from the water reservoir 218, through pressure gauge 224 and valves 226, to distributor heads 228 in modular units 202. The distributor heads 228 connect to distribution lines 230 in each of the modular units 202. Moisture sensors 232 are located in each of the modular units 202. Moisture sensors 232 are connected to controller 220, which connections are not shown in the drawings.

In the bottom of the impermeable flexible liner 214 is a pickup filter 234 that connects to return line 236, which connects through pressure gauge 238 to return pump 240. The controller 220 senses when water 242 (See FIG. 11) and nutrients have accumulated at the bottom of impermeable flexible liner 214. Then the controller 220 will turn on the return pump 240 to return the water 242 to the water reservoir 218. The sensing of water 242 and the bottom of impermeable flexible liner 214 may be by any convenient means, such as a pressure sensor or timing.

Figure 11:
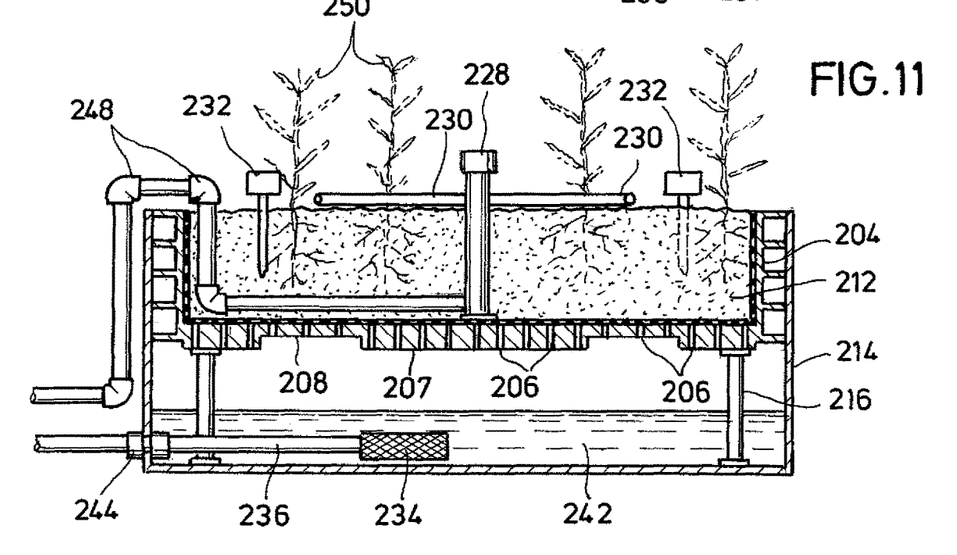
FIG. 11 is a cross-section of FIG. 10 along section lines 11-11.

To make sure that the impermeable flexible liner 214 does not leak around the return line 236, sealing connector 244 seals between the return line 236 and impermeable flexible line 214. On the input side an input line 246 is shown with elbows 248 to connect over the top of rigid box 204 to the growing soil 212.

In operation, plants 250 are planted in the growing soil 212. If the moisture sensors 232 indicate the moisture in the growing soil 212 is below the optimum moisture content, pump 212 will be turned ON to pump water 242 and nutrients from the water reservoir 218 through pressure gauge 224 and input line 246 through valves 226 into distributor heads 228. Distributor heads 228 will feed the water through distribution lines 230 to the growing soil 212. Once a desired moisture content is reached, as determined by moisture sensors 232, delivery pump 222 will be turned OFF.

As water 242 accumulates inside of impermeable flexible liner 214, return pump 240 will turn ON to create a vacuum and draw the water through pickup filter 234, return line 236, and pressure gauge 238 for discharge into water reservoir 218.

Pump 222 may be an aspirating pump that mixes air with the water 242 and other nutrients being delivered from the water reservoir 218.

By continuing to circulate the water 242 and other nutrients through the growing soil 212, the plant growing system 200, as shown in FIGS. 8-11, is similar to, but not quite the same as, a hydroponic growing system. This is a specially desirable for growing rooms that are enclosed which can control other variables, such as light, temperature or humidity. Other sensors as needed can, can be connected to controller 228 to control other functions as may be desired by the grower. When the return pump 240 turns ON relief valve 252 on the water reservoir 218 may have to open to relieve pressure therein.

The impermeable inflexible line 214 may or may not have cushioning layers 48 as described in conjunction with FIGS. 1-7. Because the plant growing system 200 is designed for a growing room, the cushioning layers 48 may not be necessary.

The nutrients being added to the water 242 and in the growing soil 212 depends on the plants 250 being grown and their nutrient requirements.

I claim:

1. A plant growing system for draining water from growing soil, the plant growing system being on a relatively flat surface and recirculating water and nutrients in the plant growing soil, said plant growing system comprising:
   a reservoir for holding said water and nutrients therein;
   modular units having open top rigid boxes that contain growing soil;
   vertical holes through said rigid boxes;
   an impermeable flexible liner below and on the sides of said modular units;
   distributors in said growing soil;
   a delivery pump for pumping water and nutrients from said reservoir through input lines to said distributors in said growing soil;
   moisture sensors in said growing soil;
   return pump for returning water and nutrients from said impermeable flexible liner through return lines to said reservoir; and
   a controller connected to said moisture sensors, said delivery pump and said return pumps;
   said controller turning ON or OFF said delivery pump depending upon signals received said moisture sensors;
   said controller turning ON or OFF said return pump when water and nutrients need to be removed from said impermeable flexible liner.

2. The plant growing system for draining water from growing soil as given in claim 1 further compromising a pressure gauge for measuring pressure in said input lines and solenoid valves in said input lines operated by said controller when said signals from said moisture sensors are received.

3. The plant growing system for driving water from growing soil as given in claim 2 wherein said delivery pump adds oxygen to said water and nutrients being pumped through said input lines.

4. The plant growing system for draining water from growing soil as recited in claim 3, wherein said return pump draws a vacuum through said return lines located below said open top rigid boxes to remove water and nutrients from said impermeable flexible liner.

5. The plant growing system for draining water from growing soil as recited in claim 4, wherein a pickup filter is on an end of said return lines located below said open top rigid boxes.

6. The plant growing system for draining water from growing soil as recited in claim 5, wherein said return line has a sealing connector where said return line extends through said impermeable flexible liner.

* * * * *